INVENTOR.
JACOB J. GINSBERG
BY
ATTORNEY

United States Patent Office 3,380,367
Patented Apr. 30, 1968

3,380,367
APPARATUS FOR THE AUTOMATIC PROCESSING OF PHOTOGRAPHICALLY EXPOSED MATERIALS
Jacob J. Ginsberg, Parsippany, N.J., assignor to Kenro Corporation, Cedar Knolls, N.J., a corporation of New Jersey
Filed Mar. 10, 1966, Ser. No. 533,141
15 Claims. (Cl. 95—89)

This invention relates generally to an apparatus for the automatic processing of photographically exposed materials, particularly of the type available under the trade name Ektalith from the Eastman Kodak Company.

The Ektalith materials that are to be processed consist of a matrix sheet which may be exposed in a suitable camera, for example, of the type disclosed in U.S. patent application Ser. No. 429,459, filed Feb. 1, 1965, Patent No. 3,290,787 and having a common assignee herewith, and a plate which is pressed against the matrix sheet after development of the exposed emulsion on the latter for transfer of an image to the plate which, upon separation from the matrix sheet, is usable as an offset duplicating master.

It is an object of this invention to provide an apparatus which is adapted to receive and expose matrix sheet and plate of the described character, and which thereafter operates automatically to develop the exposed emulsion on the matrix sheet, to transfer an image from the developed emulsion to the plate, and to deliver the image bearing plate separated from the matrix sheet.

Another object is to provide an apparatus of the described character which is relatively simple in construction and operation, and which ensures that the plate is delivered without marring of the image thereon.

In accordance with an aspect of this invention, an apparatus for developing a photographically exposed emulsion on a matrix sheet and for transferring an image from the developed emulsion to a plate usable as an offset duplicating master comprises a tank containing developing solution for the exposed emulsion, sheet positioning means which may include rollers engageable with the matrix sheet to position the latter in the tank for development of its emulsion by the solution therein and thereafter to initiate withdrawal of the developed matrix sheet from the tank, pressing and conveying means, which may also be in the form of rollers, engageable with the developed matrix sheet upon initial withdrawal from the tank and being operative to complete the withdrawal of the sheet from the tank and to move the sheet in a predetermined path toward a terminus thereof, means disengaging the rollers of the sheet positioning means from the developed matrix sheet upon engagement of the latter by the pressing and conveying means, means operative during withdrawal of the matrix sheet from the tank to feed a plate into facially abutting relation to the developed emulsion of the matrix sheet in advance of the pressing and conveying means so that the latter presses together the matrix sheet and plate and effects the transfer of an image to the plate from the developed emulsion during the conjoint movement of the matrix sheet and plate in said path, and means disposed adjacent the terminus of said path and being operative to strip the matrix sheet from the plate upon their emergence from said path.

In a preferred embodiment of the invention, the developed matrix sheet has its leading edge projecting beyond the plate during their conjoint movement by the pressing and conveying means, and the means operative to strip the matrix sheet from the plate includes deflecting means moved across the path of the conjoint movement of the matrix sheet and plate adjacent the terminus of such path to act against the projecting leading edge portion of the matrix sheet in the direction deflecting the latter away from the plate.

In order to assist the stripping or peeling action of the above mentioned deflecting means, the path in which the matrix sheet and plate are conjointly moved extends upwardly from above an opening at the top of the tank and is inclined from the vertical in the direction opposed to the direction of movement of the deflecting means across such path so that gravity tends to deflect the plate in the direction opposed to the deflection of the matrix sheet by the deflecting means.

The apparatus embodying this invention is further preferably provided with wiper means engageable with the matrix sheet during withdrawal of the latter from the tank and being operative to remove excess developing solution from the developed matrix sheet.

In a preferred embodiment of the invention, the means provided for positioning the matrix sheet in the tank includes rollers disposed adjacent an opening at the top of the tank and being relatively movable toward and away from each other for engagement with, and disengagement from the matrix sheet, and drive means for such rollers operative to rotate the latter in one direction to move a matrix sheet engaged therebetween into the tank through the opening until an edge portion of the matrix sheet is engaged between the rollers for suspending the sheet in the developing solution and, thereafter, to rotate the rollers in the opposite direction for initiating withdrawal of the developed matrix sheet from the tank.

The above, and other objects, features and advantages of this invention, will be apparent in the following detailed description of an illustrative embodiment thereof which is to be read in connection with the accompanying drawings, wherein.

Figure 1:
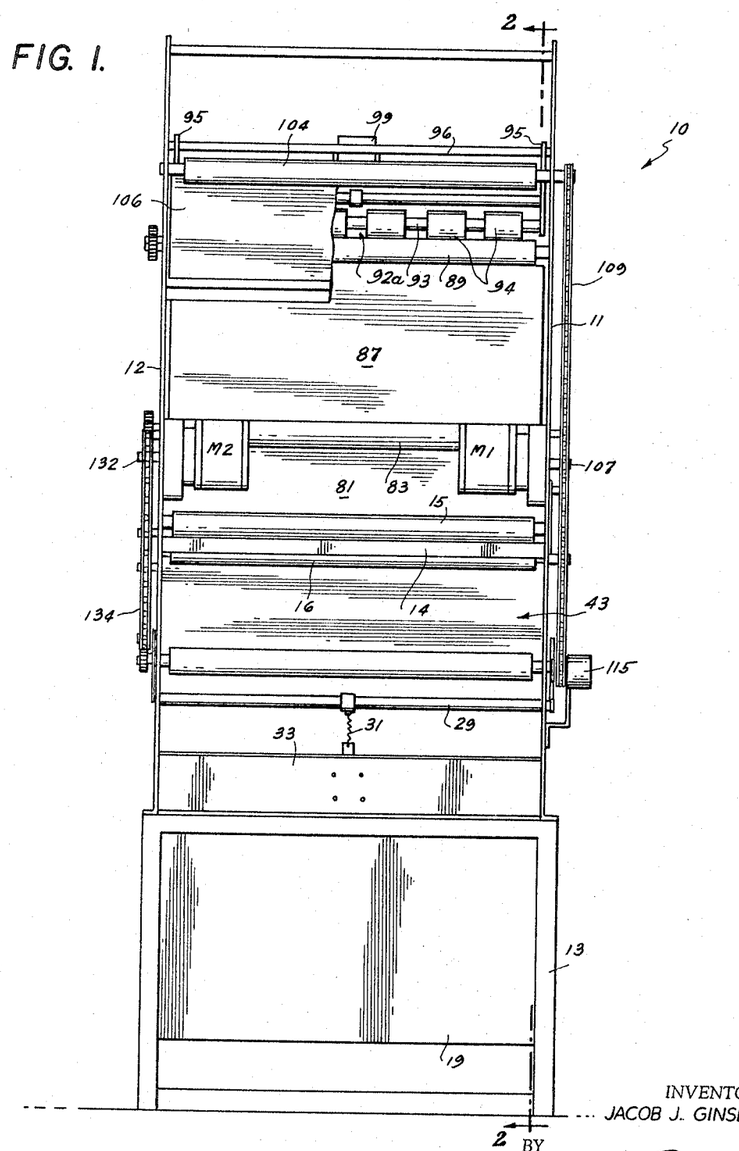
FIG. 1 is a front elevational view of an apparatus embodying this invention which is shown partly broken away.
Figure 2:
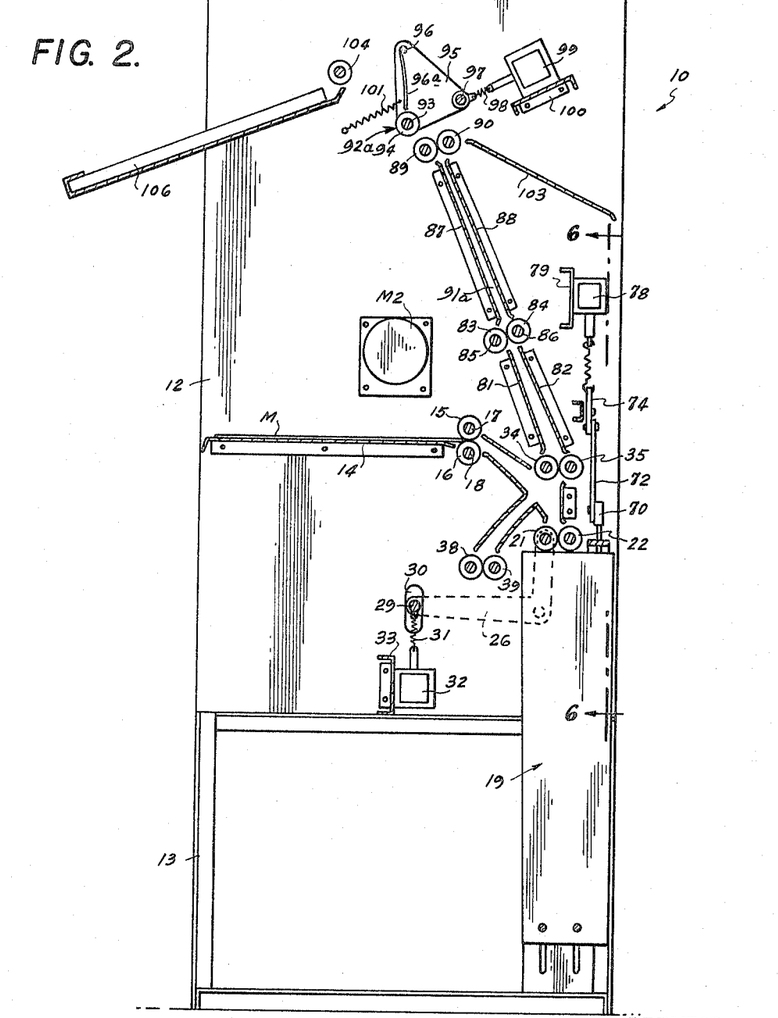
FIG. 2 is a vertical sectional view taken along the line 2—2 on FIG. 1.
Figure 3:
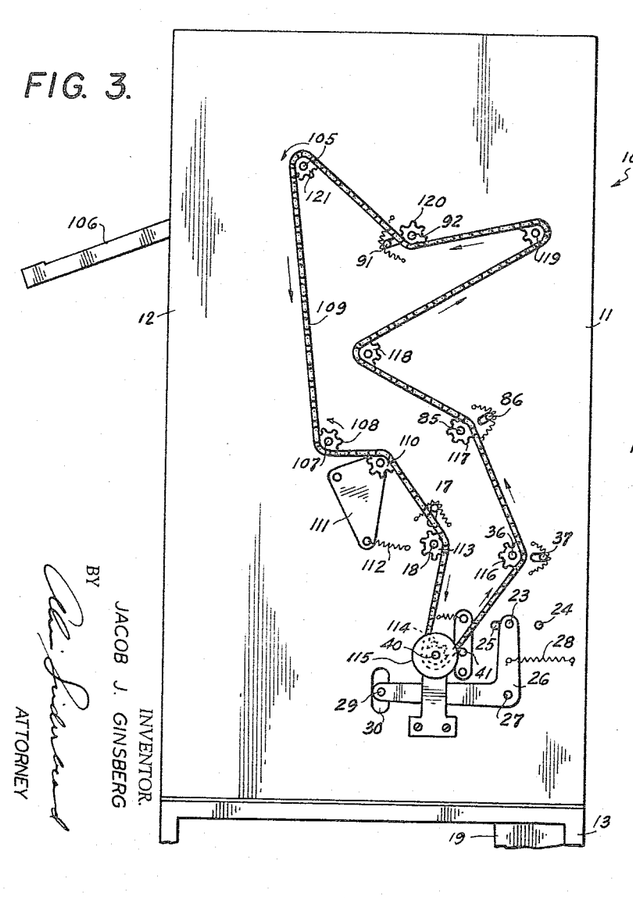
FIG. 3 is a side elevational view of the apparatus as seen from one side thereof.

Referring to the drawings in detail, it will be seen that the apparatus 10, as there shown, comprises parallel, upstanding side walls 11 and 12 held in spaced apart relation on a frame 13 (FIGS. 1, 2, 3 and 4). A horizontal shelf 14 which is spaced upwardly from frame 13 extends between side walls 11 and 12 and is adapted to support a matrix sheet having an emulsion on its downwardly facing surface which has been photographically exposed, for example, in a camera of the type disclosed in U.S. patent application Ser. No. 429,459. Feed rollers 15 and 16 (FIGS. 2 and 5) extend laterally between side walls 11 and 12 adjacent the back edge of shelf 14 and have the ends of their shafts 17 and 18, respectively, suitably journalled in the side walls for rolling contact with each other at a plane which is a horizontal extension of the top surface of shelf 14. Thus, a matrix sheet M can be manually or otherwise positioned on shelf 14 with the back end edge of the sheet extending into the nip between rollers 15 and 16 (FIG. 2).

A vertical tank 19 adapted to contain developing solution for the emulsion on matrix sheet M and having an opening 20 (FIG. 5) at its upper end is suitably supported in frame 13 so as to extend between the rear portions of side walls 11 and 12 and have its top opening 20 disposed to the rear of rollers 15 and 16 and at a level substantially below the latter. Rollers 21 and 22 extend laterally between side walls 11 and 12 adjacent tank opening 20 and have shafts 23 and 24, respectively, that are rotatably supported to permit relative movement of rollers 21 and 22 toward and away from each other. As shown on FIGS. 3 and 4, the ends of shaft 24 may be suitably journalled in side walls 11 and 12, whereas the ends of shaft 23 extend through slots 25 in the side walls and are journalled in bell cranks 26 pivotally mounted, as at 27, on side walls 11 and 12. Springs 28 are connected to bell cranks 26 to urge the latter to rock in the direction moving roller 21 rearwardly toward roller 22, thereby to engage a matrix sheet M between such rollers, as shown on FIG. 5. Bell cranks 26 are further connected by a lateral rod 29 extending through slots 30 in side walls 11 and 12. As shown particularly on FIG. 2, the center of lateral rod 29 is connected, as by a spring 31, with the armature of a solenoid 32 mounted on a lateral member 33 extending between the side walls. When solenoid 32 is energized, as hereinafter described in detail, rod 29 is drawn downwardly to rock bell cranks 26 in a direction moving roller 21 forwardly away from roller 22 for disengaging the matrix sheet M therebetween.

Spaced upwardly from rollers 21 and 22 are a first set of pressing and conveying rollers 34 and 35 (FIGS. 2 and 5) mounted on shafts 36 and 37 which are journalled, at their ends, in side walls 11 and 12. Plate feeding rollers 38 and 39 also extend laterally between side walls 11 and 12 in front of tank 19 at a level below rollers 21 and 22 and are mounted on shafts 40 and 41, respectively, which are rotatably supported, at their ends, by walls 11 and 12.

Figure 5:
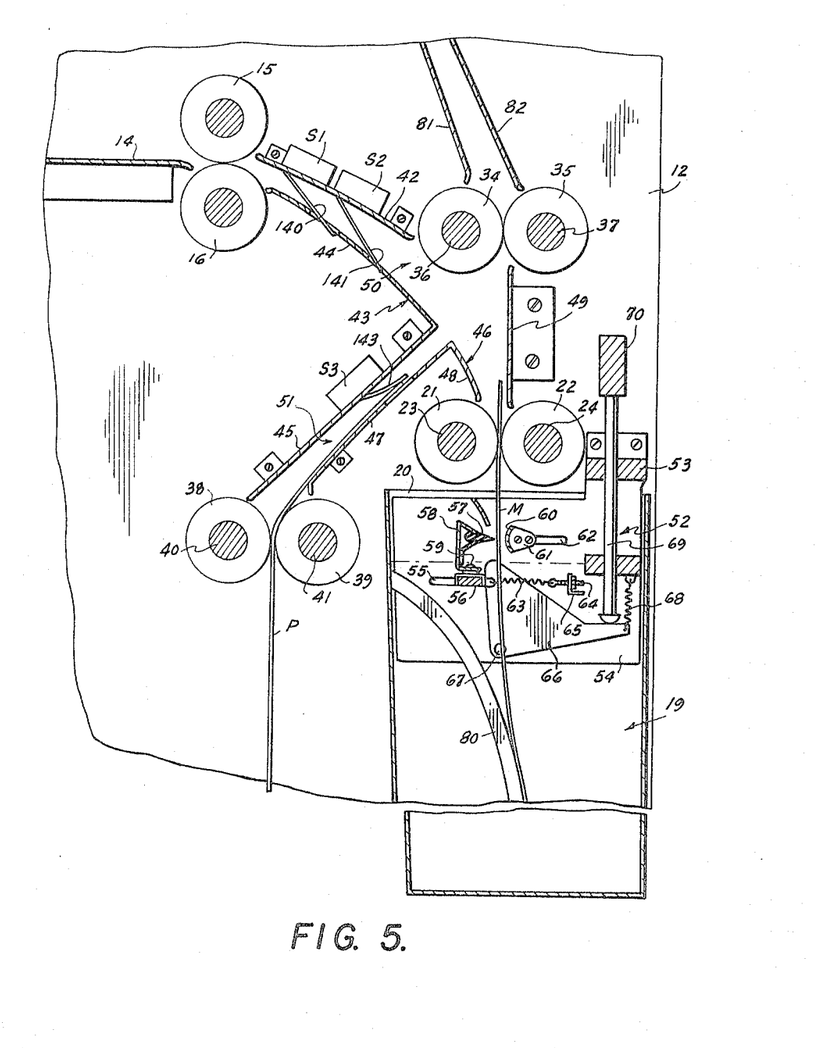
FIG. 5 is an enlarged sectional view showing details of that portion of the apparatus appearing on FIG. 2 by which a matrix sheet is positioned in the tank containing developing solution and thereafter brought together with a plate for transfer of an image to the latter.

As shown particularly on FIG. 5, a guide plate 42 extends laterally between side walls 11 and 12 and is inclined downwardly from roller 15 to roller 34. An angled guide plate 43 also extends laterally between side walls 11 and 12 and includes a portion 44 which is inclined downwardly from roller 16 and spaced from guide plate 42, and a portion 45 which extends upwardly and rearwardly from roller 38. Another angled guide plate 46 extends laterally between side walls 11 and 12 and has a portion 47 which extends upwardly and rearwardly from roller 39 in substantially spaced, slightly converging relation to portion 45 of guide plate 43, and a portion 48 which extends downwardly and rearwardly to roller 21 and forms an extension of the surface of portion 44 of guide plate 43. A guide plate 49 extends laterally between side walls 11 and 12 and reaches substantially vertically from roller 22 to roller 35.

It will be apparent from FIG. 5 that guide plate 42, portions 44 and 48 of guide plates 43 and 46, and guide plate 49 define a channel or passage 50 therebetween for guiding a matrix sheet in a downwardly and rearwardly curved path from rollers 15 and 16 to rollers 21 and 22. Further, it will be seen that portions 45 and 47 of guide plates 43 and 46 cooperate to define a passageway 51 therebetween which opens into passage or channel 50 and which acts to guide a plate P from rollers 38 and 39 in a path that extends upwardly and rearwardly so as to converge with a matrix sheet moving upwardly in the substantially vertical plane between the nip of rollers 21 and 22 and the nip of rollers 34 and 35.

Mounted within the upper portion of tank 19 is a wiper assembly 52 (FIG. 5) that includes a support bar 53 extending laterally between side walls 11 and 12 in back of roller 22 and being suitably suspended from the side walls. End plates 54 depend from bar 53 so as to extend into tank 19 adjacent the opposite ends of the latter and such end plates have horizontal slots 55 slidably receiving the ends of a laterally extending carrier bar 56. A rubber wiper blade 57 mounted in a holder 58 extends laterally between end plates 54, and the holder 58 is pivotally mounted at its center, as at 59, on carrier bar 56 so as to be movable with the latter for displacing the wiper blade 57 rearwardly toward, and forwardly away from the vertical plane extending downwardly from the nip between rollers 21 and 22. In back of such vertical plane there is provided an elongated pressure plate 60 of arcuate cross-section having brackets 61 at its opposite ends releasably secured in horizontal slots 62 formed in end plates 54 so that pressure plate 60 can be adjusted forwardly and rearwardly. Springs 63 extend rearwardly from the ends of carrier bar 56 to anchor screws 64 that are adjustably secured to an angle member 65 extending laterally between end plates 54. Thus, springs 63 urge carrier 56 rearwardly so as to press wiper blade 57 against a matrix sheet M disposed between the blade and the adjustable pressure plate 60.

Figure 6:
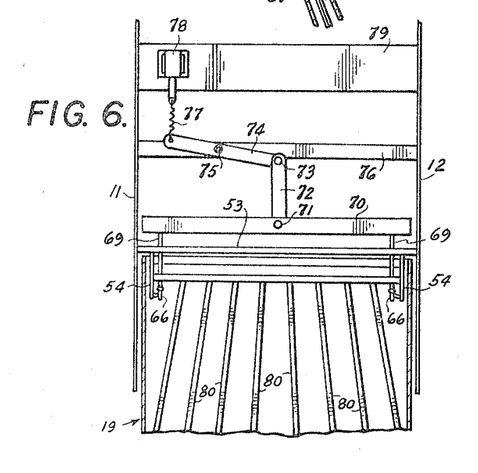
FIG. 6 is a detail sectional view taken along the line 6—6 on FIG. 2.

Blade actuating levers 66 are pivoted, as at 67, on end plates 54 and are urged by relatively strong springs 68 to rock in the counterclockwise direction, as viewed on FIG. 5, whereby the forward edges of actuating levers 66 act on carrier bar 56 to move the latter forwardly by overcoming the resistance of springs 63, and thus space blade 57 from pressure plate 60. Vertical rods 69 are slidable in bar 53 so as to be engageable, at their lower ends, with actuating levers 66. The upper ends of rods 69 are connected by a lateral bar 70 which, at its center, is pivotally connected at 71 to the lower end of a link 72. The upper end of link 72 is pivotally connected at 73 to one end of a double-armed lever 74 (FIGS. 2 and 6). Lever 74 is pivotally mounted intermediate its ends, as at 75, on a channel member 76 extending laterally between side walls 11 and 12. The end of lever 74 remote from the pivotal connection 73 to link 72 is connected by a spring 77 to the armature of a solenoid 78 which is secured to a channel member 79 extending between side walls 11 and 12. The arrangement is such that energization of solenoid 78 causes downward movement of bar 70 and rods 69 for rocking actuating levers 66 in the clockwise direction, as viewed on FIG. 5, thereby to permit springs 63 to move blade 57 to its operative position in wiping engagement with a matrix sheet M between the blade and pressure plate 60.

Also mounted within tank 19 are guide bars 80 (FIGS. 5 and 6) which extend downwardly from the front wall of the tank and are inclined toward the rear so as to extend across the vertical plane passing between rollers 21 and 22, and which further diverge laterally in the downward direction, as shown on FIG. 6. The rods 80, which may be formed of methyl methacrylate, function to prevent curling of the matrix sheet M when the latter is moved by rollers 21 and 22 into the developing solution in tank 19.

Guide plates 81 and 82 extend upwardly from pressing and conveying rollers 34 and 35 between side walls 11 and 12 and are inclined forwardly from the vertical (FIGS. 2 and 5). A second set of pressing and conveying rollers 83 and 84 extend laterally between side walls 11 and 12 adjacent the upper edges of guide plates 81 and 82 and are mounted on shafts 85 and 86 which are suitably journalled in the side walls. Additional guide plates 87 and 88 extend upwardly from rollers 83 and 84 between side walls 11 and 12 and are inclined forwardly from the vertical at an angle approximately equal to the angle of inclination of guide plates 81 and 82. A final pair of pressing and conveying rollers 89 and 90 extend laterally between side walls 11 and 12 adjacent the upper edges of guide plates 87 and 88 and are mounted on shafts 91 and 92 which have their ends suitably journalled in the side walls. Rollers 34 and 35, 83 and 84, and 89 and 90, and guide plates 81 and 82, and 87 and 88 interposed therebetween cooperate to define a path 91a for the conjoint movement of a developed matrix sheet and a plate during which the matrix sheet and plate are pressed together to effect the transfer of an image from the developed emulsion of the matrix sheet to the plate, as hereinafter described in detail.

Figure 7:
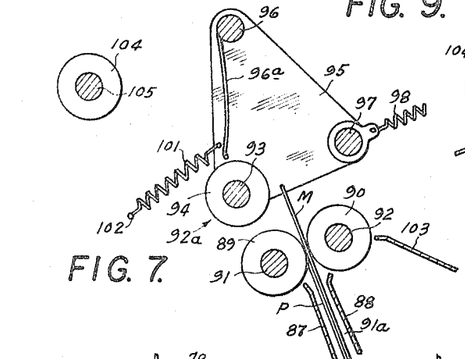
FIG. 7 is an enlarged sectional view showing details of another portion of the apparatus appearing on FIG. 2 by which the matrix sheet is stripped from the plate following the transfer of an image to the latter.
Figure 8:
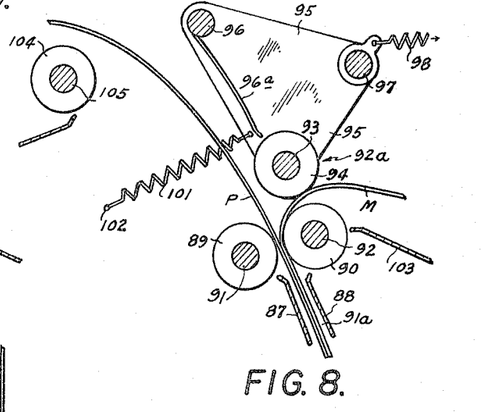
FIG. 8 is a view similar to that of FIG. 7, but showing another stage in the operation of the illustrated portion of the apparatus.

Disposed adjacent the upper terminus of the path 91a is a deflecting member 92a (FIGS. 1, 2, 7 and 8) which, in the embodiment shown, includes a laterally extending shaft 93 having axially spaced rollers 94 of Teflon, that is, polytetrafluoroethylene, thereon. The ends of shaft 93 are journalled in triangular support plates 95 which are, in turn, suspended from a shaft 96 journalled, at its ends, in side walls 11 and 12. Shaft 96 also carries fingers 96a (FIGS. 2, 7 and 8) depending therefrom toward deflecting member 92a. The pivotally suspended support plates 95 are further connected by a rod 97 which, at its center, is connected by a rearwardly extending spring 98 to the armature of a solenoid 99 mounted on a support member 100 extending laterally between the side walls well to the rear of roller 90 (FIG. 2). Tension springs 101 extend forwardly from pivoted support plates 95 to suitable anchors 102 extending from side walls 11 and 12 so as to yieldably urge the support plates 95 normal positions at which rollers 94 are disposed in front of the extension of path 91a beyond rollers 89 and 90, as shown on FIGS. 2 and 7. However, when solenoid 99 is energized, support plates 95 are rocked rearwardly against the resistance of springs 101 and thereby dispose rollers 94 above roller 90, that is, substantially to the rear of the extension of path 91a, as shown on FIG. 8, thereby to effect the stripping of the developed matrix sheet from the plate, as hereinafter described in detail.

A chute 103 (FIGS. 2, 7 and 8) may extend downwardly and rearwardly from roller 90 to guide each matrix sheet into a suitable discharge receptacle (not shown) after such matrix sheet has been separated or stripped from the plate. If desired, the chute 103 may have openings therein through which air is made to stream upwardly from a suitable source of compressed air (not shown) so as to maintain an air flow over the upper surface of the chute for preventing adherence of the tacky matrix sheet thereto.

A feed roller 104 extends laterally between side walls 11 and 12 at a location spaced upwardly and forwardly from roller 89 and is mounted on a shaft 105 having its ends suitably journalled in the side walls. A tray 106 extends forwardly and downwardly from feed roller 104 between side walls 11 and 12 and is intended to receive each plate following the stripping or separation of the matrix sheet therefrom.

As shown on FIG. 1, two motors M1 and M2 are respectively mounted on side walls 11 and 12. The shaft 107 of motor M1 extends outwardly through side wall 11 and carries a drive sprocket 108 which is rotated in the counterclockwise direction, as viewed on FIG. 3, during operation of motor M1. Sprocket 108 drives an endless chain 109 which, considered in the direction of movement of the chain from sprocket 108, runs successively around a tensioning sprocket 110 carried by a pivoted support 111 acted on by a spring 112, a sprocket 113 on shaft 18, a sprocket 114 (shown in broken lines on FIG. 3) which is coupled to shaft 40 by an electromagnetic clutch 115, a sprocket 116 on shaft 36, a sprocket 117 on shaft 85, idler sprockets 118 and 119, a sprocket 120 on shaft 92, and a sprocket 121 on shaft 105. Thus, when motor M1 is energized, shafts 18, 36, 85, 92 and 105 are continuously driven, whereas shaft 40 is driven only upon energization of the associated clutch 115.

Figure 4:
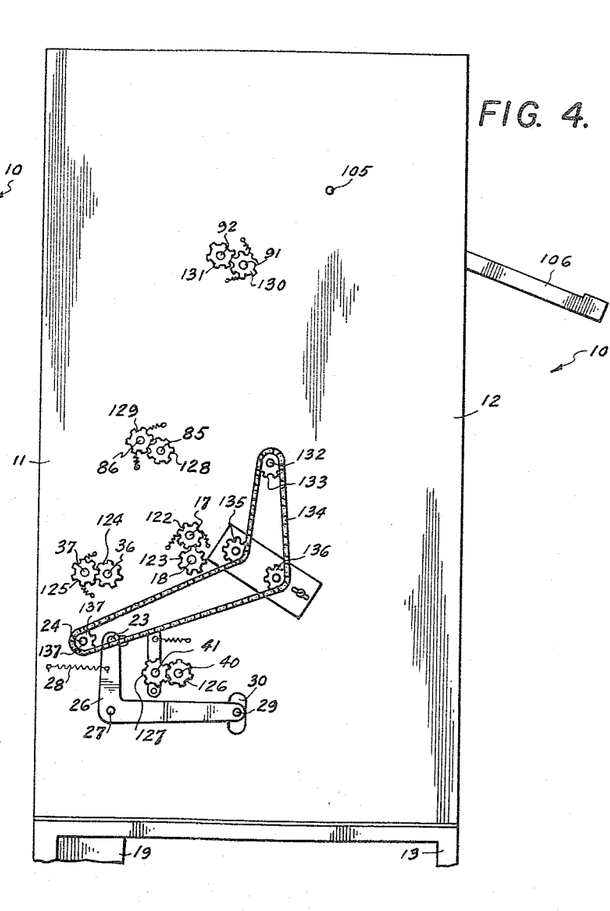
FIG. 4 is a side elevational view of the apparatus as seen from the opposite side thereof.

As shown on FIG. 4, shaft 17 is driven from shaft 18 through meshing gears 122 and 123 mounted on the ends thereof extending through side wall 12. Similarly, shaft 37 is driven from shaft 36 through meshing gears 124 and 125, shaft 41 is driven from shaft 40 through meshing gears 126 and 127, shaft 86 is driven from shaft 85 through meshing gears 128 and 129, and shaft 91 is driven from shaft 92 through meshing gears 130 and 131. Further, as shown on FIG. 4, the shaft 132 of motor M2 extends through side wall 12 and carries a sprocket 133 for driving a chain 134 which runs around idler sprockets 135 and 136 and a sprocket 137 secured on the end of shaft 24 projecting through side wall 12. Motor M2 is reversible and has a normally engaged brake associated therewith to normally halt the rotation of shaft 132, with such brake being released to permit rotation of shaft 132 only upon energization of a brake releasing coil or solenoid 138 (FIG. 9).

Figure 9:
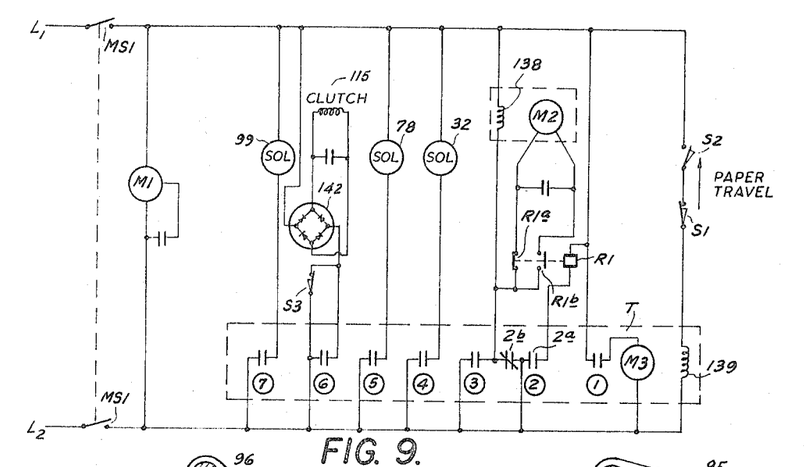
FIG. 9 is a schematic wiring diagram showing the electrical controls for the apparatus embodying this invention.

As shown on FIG. 9, the control circuits for the described apparatus embodying this invention include a timer T of conventional construction having a starting coil 139 and drive motor M3. The arrangement in timer T is such that, upon energization of starting coil 139, a normally open contact 1 connected in series with the motor M3 in the energizing circuit for the latter is closed to cause operation of motor M3 until a cam shaft (not shown) driven by the latter has completed a single revolution. Such cam shaft has cams thereon to effect the sequential actuation of timer contacts 2, 3, 4, 5, 6 and 7, in the order enumerated, during the single revolution of the cam shaft. The contacts at position 2 include a normally open contact 2a and a normally closed contact 2b, whereas all of the other cam actuated timer contacts are normally open, as shown.

The control circuits for apparatus 10 are all connected to power supply lines $L_1$ and $L_2$ through a manually actuated switch MS1, and the circuit for energizing the starting coil 139 of timer T further includes series connected switches S1 and S2 which are normally closed and normally opened, respectively. As shown on FIG. 5, the switches S1 and S2 may be snap-action or microswitches having actuating members 140 and 141 projecting into the passage 50 between guide plate 42 and the portion 44 of guide plate 43 so as to be successively engaged by a matrix sheet during the movement of the latter from rollers 15 and 16 to rollers 21 and 22. It will be apparent that switches S1 and S2 are simultaneously closed to effect energizing of starting coil 139 of the timer only when actuating member 141 of switch S2 is engaged by the trailing edge portion of a matrix sheet so as to close normally open switch S2, while the trailing edge portion of the matrix sheet has released switch actuator 140 to permit switch S1 to return to its normally closed position.

The normally open contact 2a of timer T is connected in series with the coil of a relay R1 having a normally closed contact R1a and a normally open contact R1b. The normally closed contact 2b of timer T is connected in series with the brake releasing coil 138 so that the brake associated with motor M2 will be released when contact 2b is in its normally closed condition. The normally closed relay contact R1a is also connected in series with the normally closed timer contact 2b in the circuit for energizing motor M2 so as to effect rotation of shaft 24 and roller 22 in the counterclockwise direction, as viewed on FIG. 5, that is, in the direction for effecting downward movement of a matrix sheet between rollers 21 and 22 and into tank 19. The normally open relay contact R1b is connected in series with the normally open timer contact 3 in the circuit for energizing motor M2 so as to rotate its shaft 132 in the direction for effecting clockwise rotation of roller 22, as viewed on FIG. 5, that is, for moving a matrix sheet upwardly from tank 19 between rollers 21 and 22. The brake releasing coil 138 is also connected in series with timer contact (3) so as to be energized for releasing the brake when motor M2 effects rotation of roller 22 in the clockwise direction, as viewed on FIG. 5.

The solenoids 32 and 78 which effect movement of roller 21 away from roller 22 and which permit the movement of wiper blade 57 against a matrix sheet being removed from tank 19, respectively, are connected in series with timer contacts 4 and 5, respectively. A full wave rectifier 142 for supplying direct current to the coil of clutch 115, thereby to engage the latter, has the normally open timer contact 6 and a normally closed switch S3 connected in parallel in its energizing circuit. As shown on FIG. 5, the switch S3 may be a microswitch mounted adjacent the passageway 51 and having a switch actuator 143 projecting into passage 51 so as to be engageable by a plate P in such passage. Thus, the coil of clutch 115 is energized so as to engage the clutch and thereby effect rotation of rollers 38 and 39 either when actuator 143 is not engaged by a plate in passage 51 or when timer contact 6 is closed during the operating cycle of timer T.

Finally, solenoid 99 is connected in series with timer contact 7 so as to be energized when such timer contact is closed during the final phase of the operating cycle of timer T, and motor M1 is connected in series directly with the manually actuated switch MS1 so as to be operated whenever such switch is closed.

The apparatus 10 described above operates as follows:

Switch MS1 is closed so as to cause continuous operation of motor M1. A matrix sheet having an exposed emulsion on one side is positioned, either manually or otherwise, with that side facing down on shelf 14 so that the back end edge of the matrix sheet extends into the nip between rollers 15 and 16. The rollers 15 and 16, being driven from the motor M1, propel the matrix sheet therebetween and along the downwardly and rearwardly curved passage 50 toward the nip between rollers 21 and 22. A plate P which is to have an image transferred thereto from the matrix sheet after development of the latter is positioned, either manually or otherwise, so that its upper end edge extends into the nip between rollers 38 and 39. Since no plate is present in passage 51 to engage actuator 143 of switch S3, the latter is in its normally closed condition and the coil of clutch 115 is energized, whereby rollers 38 and 39 are driven from motor M1 to advance the plate P along passage 51. However, when the leading or upper end edge of the plate engages switch actuator 143, as shown on FIG. 5, switch S3 is opened to cause deenergizing of the coil of clutch 115, and thereby halt the rotation of rollers 38 and 39.

When the matrix sheet M, in moving along the downwardly and rearwardly curved passage 50, simultaneously engages both switch actuators 140 and 141, switch S1 is opened and switch S2 is closed so that the circuit for energizing the starting coil 139 of timer T is still incomplete. Prior to initiation of the operation of timer T, the brake releasing coil 138 is energized through normally closed timer contact 2b, and motor M2 is also energized through normally closed timer contact 2b and normally closed relay contact R1a so as to effect rotation of roller 22 in the counterclockwise direction, as viewed on FIG. 5. During such rotation of roller 22, the matrix sheet propelled downwardly into the nip between rollers 21 and 22 is further moved downwardly by rollers 21 and 22 so as to enter tank 19. When the trailing end of the matrix sheet moves past switch actuator 140, but still engages switch actuator 141, switch S1 returns to its normally closed position and switch S2 is still held in its closed position, thereby to complete the circuit for energizing starting coil 139 of the timer. The energizing of coil 139 closes timer contact 1 and thereby energizes timer motor M3. At a predetermined time following such initiation of the operation of timer motor M3, timer contact 2a closes and timer contact 2b opens. The opening of timer contact 2b deenergizes brake releasing coil 138 and also interrupts the energizing circuit by which motor M2 was operated to effect rotation of roller 22 in the counterclockwise direction, whereby rotation of roller 22 is halted with the upper end portion of the matrix sheet gripped between rollers 21 and 22, as shown on FIG. 5. When the upper end edge portion of the matrix sheet is thus gripped between non-rotated rollers 21 and 22, the matrix sheet is suspended therefrom and immersed in the developing solution contained in tank 19. The tendency of the matrix sheet to curl upon entering the developing solution by reason of movement of the sheet over rollers 16 and 21 is resisted by the guide rods 80 in tank 19.

The closing of timer contact 2a energizes relay R1 so as to open relay contact R1a and close relay contact R1b. However, closing of relay contact R1b does not immediately effect operation of motor M2 so as to effect rotation of roller 22 in the clockwise direction, as viewed on FIG. 5, as such relay contact R1b is in series with the opened contact 2b and the normally open timer contact 3.

At the conclusion of a preset time for development of the emulsion on the matrix sheet immersed in the developing solution, timer contact 3 closes and thereby completes the circuit for operating motor M2 so as to effect rotation of roller 22 in the clockwise direction, thereby to initiate upward withdrawal of the developed matrix sheet from tank 19. Such initial upward movement of the developed matrix sheet moves the upper end edge of the sheet into the nip between the first set of pressing and conveying rollers 34 and 35 which are driven from motor M1 so as to effect the further upward movement of the matrix sheet. The vertical distance between rollers 34 and 35 and rollers 21 and 22 is such that the upper end edge of the matrix sheet will enter the nip between rollers 34 and 35 while the rollers 21 and 22 still engage the portion of the matrix sheet that remained above the surface of the developing solution in tank 19. At the moment when the upper end edge of the developed matrix sheet enters the nip between rollers 34 and 35, timer T closes its contact 4 and thereby energizes solenoid 32 so that roller 21 is moved forwardly away from roller 22. Thus, as the developed emulsion on the matrix sheet comes into the zone between rollers 21 and 22, roller 21 is moved away from the developed emulsion and avoids any injurious contact therewith. During the upward withdrawal of the matrix sheet from tank 19, timer T also closes its contact 5 and thereby causes energizing of solenoid 78 for rocking actuating levers 66 away from carrier bar 56 and thereby permitting springs 63 to move blade 57 toward pressure plate 60 for removing excess developing solution from the matrix sheet being withdrawn from the tank.

At a preset time during the upward withdrawal of the developed matrix sheet from tank 19, timer T also closes its contact 6, whereby the coil of clutch 115 is energized to engage such clutch and again cause rotation of rollers 38 and 39 from motor M1. Such rotation of rollers 38 and 39 drives the plate P through passage 51 along a path that converges with the path of the developed matrix sheet moving upwardly between the separated rollers 21 and 22 to the rollers 34 and 35 thereabove. The moment of closing of timer contact 6 is preset in relation to the moment when upward withdrawal of the developed matrix sheet is initiated so that, when the plate P converges with the upwardly moving matrix sheet, the upper edge portion of the developed matrix sheet, which has been held out of the developing solution, will project upwardly beyond the upper edge portion of the plate. The converged matrix sheet and plate move conjointly between driven rollers 34 and 35 and are thereby pressed together into an adherent sandwich in which the plate confronts the surface of the matrix sheet having the developed emulsion thereon and the upper or leading end portion of the matrix sheet projects beyond the adjacent upper end of the plate. Such sandwich is moved in the upwardly and forwardly inclined path 91a while pressure is simultaneously applied thereto by the rollers 34 and 35, the rollers 83 and 84 and the rollers 89 and 90, in succession, so as to transfer an image from the developed emulsion of the matrix sheet to the confronting surface of the plate.

As the projecting upper or leading end portion of the matrix sheet emerges from between rollers 89 and 90 at the upper terminus of path 91a, timer T closes its contact 7 and thereby energizes solenoid 99. Such energizing of solenoid 99 moves rollers 94 of deflecting member 92a from the position shown on FIG. 7 to the position shown on FIG. 8, and thereby rearwardly deflects the projecting upper or leading end portion of the matrix sheet M away from the plate P. The stiffness or resistance to bending of the plate P is greater than the force of adhesion between the matrix sheet and the plate so that, upon deflection of the matrix sheet, the plate P tends to continue moving along an extension of the path 91a, that is, away from the rearwardly deflected matrix sheet which is thereby stripped from the plate.

Further, the forward inclination of the path 91a ensures that gravity acting on the plate P emerging from between rollers 89 and 90 will tend to cause forward bending of the plate, that is, bending of the plate away from the rearwardly deflected matrix sheet which is relatively limp due to its previous immersion in the developing solution. As the matrix sheet and plate continue to emerge from between rollers 89 and 90, the matrix sheet stripped from the plate is deflected rearwardly over roller 90 so as to move chute 103 into the suitable discharge receptacle. The position of rollers 94 in response to energizing of solenoid 99 serve to space such rollers 94 rearwardly from the plate P following stripping of the matrix sheet therefrom so that there is no danger of injurious contact of rollers 94 with the image transferred to the plate. Such image transferred to the plate is disposed on the surface of the latter which is uppermost as the plate curves forwardly over roller 104 and into tray 106. When the trailing end of the plate P has emerged from between rollers 89 and 90, the bottom surface of the plate comes into contact with roller 104 driven from motor M1 so as to complete the feeding movement of the finished plate P into the tray 106.

After the finished plate bearing the desired image has been deposited in tray 106, timer T completes its timing cycle and thereby returns its contacts to the postions shown on FIG. 9 so as to condition the apparatus for the repetition of its operating cycle.

It will be apparent that, in the apparatus 10, as described above, the developing of the exposed matrix sheet, the removal of the developed matrix sheet from the developing solution, the pressing together of the developed matrix sheet and the plate so as to effect transfer of an image from the developed emulsion to the plate, and the stripping of the matrix sheet from the plate so as to permit the delivery of the finished plate apart from the matrix sheet are all performed automatically and in a predetermined sequence so as to ensure uniformly correct development of the emulsion and the transfer of a high quality image to the plate. Further, the several sequential functions of the apparatus, as mentioned above, are all performed in a manner to avoid any marring of the image and the transferring of developing solution or developed emulsion to surface of rollers or other members in the apparatus coming into contact with the delivered plate.

Although an illustrative embodiment of the invention has been described in detail herein with reference to the accompanying drawings, it is to be understood that the invention is not limited to that precise embodiment, and that various changes and modifications may be effected therein by one skilled in the art without departing from the scope or spirit of the invention, except as defined in the appended claims.

What is claimed is:

1. An apparatus for developing a photographically exposed emulsion on a matrix sheet and for transferring an image from the developed emulsion to a plate usable as an offset duplicating master, comprising a tank containing developing solution for the exposed emulsion on a matrix sheet, first means engageable with a matrix sheet to position the latter in said tank for development of its emulsion by said solution and thereafter to initiate withdrawal of the developed matrix sheet from said tank, pressing and conveying means engageable with the developed matrix sheet upon initial withdrawal from said tank and being operative to complete the withdrawal of the sheet from the tank and to move the sheet in a predetermined path toward a terminus thereof, means disengaging said first means from the developed matrix sheet upon engagement of the latter by said pressing and conveying means, means operative during withdrawal of the matrix sheet from said tank to feed a plate into facially abutting relation to the developed emulsion of the matrix sheet in advance of said pressing and conveying means so that the latter presses together the matrix sheet and plate and effects the transfer of an image to the plate from the developed emulsion during conjoint movement of the matrix sheet and plate in said path, and means disposed adjacent said terminus of the path and being operative to strip the matrix from the plate upon the emergence thereof from said path.

2. An apparatus according to claim 1; wherein the developed matrix sheet has its leading edge projecting beyond the plate during said conjoint movement of the matrix sheet and plate in said path, and said means operative to strip the matrix sheet from the plate includes deflecting means moved across said path adjacent said terminus to act against the projecting leading edge portion of the matrix sheet in the direction deflecting the latter away from the plate.

3. An apparatus according to claim 2; further comprising wiper means engageable with the matrix sheet during withdrawal of the latter from said tank and being operative to remove excess developing solution from the developed matrix sheet.

4. An apparatus according to claim 2; wherein said tank has an opening at the top thereof and said path in which the matrix sheet and plate are conjointly moved extends upwardly from above said opening and is inclined from the vertical in the direction opposed to the direction of movement of said deflecting means across said path.

5. An apparatus according to claim 4; wherein said first means includes rollers disposed adjacent said opening of the tank and being relatively movable toward and away from each other for engagement with, and disengagement from a matrix sheet, and drive means for at least one of said rollers operative to rotate the latter in one direction to move a matrix sheet engaged therebetween into said tank through said opening until an edge portion of the matrix sheet is engaged between said rollers for suspending the sheet in the developing solution and, thereafter, to rotate said rollers in the opposite direction for initiating said withdrawal of the matrix sheet from the tank following developing thereof.

6. An apparatus according to claim 5; wherein said means disengaging the first means from the developed matrix sheet includes electro-magnetic means operative, upon engagement of the matrix sheet by said pressing and conveying means, to effect relative movement of said rollers away from each other.

7. An apparatus according to claim 5; further comprising means defining a substantially horizontal support surface to carry the matrix sheet with the exposed emulsion facing downwardly thereon, downwardly curved guide means extending from said support surface to said rollers, and means operative to advance the matrix sheet from said support surface and along said guide means to said rollers.

8. An apparatus according to claim 7; wherein said means to feed a plate into facially abutting relation to the matrix sheet in advance of said pressing and carrying means includes means defining a passage for the plate opening through said guide means and guiding the plate in a direction that converges upwardly toward the matrix sheet between said rollers and said pressing and conveying means, and means operative upon rotation of said rollers in said opposite direction to advance a plate along said passage.

9. An apparatus according to claim 7; wherein said tank has a series of downwardly diverging elongated members therein lying in a plane that is inclined from a vertical plane passing through said opening of the tank for preventing curling of the matrix sheet in the developing solution.

10. An apparatus according to claim 1; wherein said pressing and conveying means includes sets of drive rollers spaced apart along said path to engage the facially abttuing matrix sheet and plate at their outer surfaces and thereby to press together the sheet and plate.

11. An apparatus according to claim 10; wherein the developed matrix sheet has its leading end projecting beyond the plate during said conjoint movement of the matrix sheet and plate in said path, and said means operative to strip the matrix sheet from the plate includes deflecting roller means extending parallel to and adjacent the set of said drive rollers furthest from said tank, means normally positioning said deflecting roller means at the side of said path toward which said plate faces during the conjoint movement of said plate with said matrix sheet, and means moving said deflecting roller means to the opposite side of said path upon the emergence of the projecting end of the matrix sheet from between said adjacent set of rollers, thereby to act against said projecting leading end in the direction away from the plate.

12. An apparatus according to claim 1; wherein said tank extends generally vertically and has an opening at the top thereof; and
wherein said first means includes rollers disposed adjacent said opening of the tank and being relatively movable toward and away from each other for engagement with and disengagement from a matrix sheet therebetween, drive means operative to rotate at least one of said rollers in one direction to move a matrix sheet engaged between the rollers into said tank through said opening and in the other direction to initiate withdrawal of the matrix sheet from the tank after its development, means defining a support surface to receive a matrix sheet to be developed, means operative to advance a matrix sheet from said support surface to said rollers, and control means for said drive means to cause the latter to rotate said rollers in said one direction during advancement of a matrix sheet from said support surface, to halt such rotation of the rollers in response to the detection of the trailing edge of the matrix sheet between said support surface and rollers whereby the latter come to rest with an edge portion of the matrix sheet gripped therebetween to suspend the sheet in said tank, and to cause rotation of said rollers in said other direction after a predetermined period of suspension of the matrix sheet into the tank from said rollers.

13. An apparatus according to claim 12; further comprising a wiper assembly in said tank including a pressure plate extending across the tank at one side of a matrix sheet suspended from said rollers, a flexible wiper blade movable toward and away from said pressure plate at the other side of the matrix sheet, spring means urging said blade toward said plate to wipe excess developing solution from a matrix sheet during withdrawal of the latter from said tank disengaging means normally overcoming said spring means to hold said blade away from said pressure plate, and electromagnetic means energized during withdrawal of a matrix sheet from the tank to render said disengaging means inoperative.

14. An apparatus according to claim 12; wherein said tank has a series of elongated members lying in a plane that is inclined to extend across a vertical plane passing between said rollers adjacent said opening of the tank and said elongated members diverge laterally downward in said inclined plane to prevent curling of a matrix sheet entering a developing solution in the tank.

15. An apparatus according to claim 12; wherein said means to feed a plate into facially abutting relation to the matrix sheet includes means defining a passage for the plate opening between said rollers and said support surface in a direction enclosing an acute angle with respect to a vertical plane extending upwardly from between said rollers so as to guide the plate in a path that converges with the matrix sheet moving between said rollers and said pressing and conveying means, and means operative to move the plate along said passage upon rotation of said rollers in said other direction.

References Cited

UNITED STATES PATENTS 3,203,335    8/1965    Wanielista et al. _______ 95—89
3,277,808    11/1966    Frohock _____________ 95—89

NORTON ANSHER, *Primary Examiner.*

C. E. SMITH, *Assistant Examiner.*